US005578352A

United States Patent [19]

Smith

[11] Patent Number: 5,578,352

[45] Date of Patent: Nov. 26, 1996

[54] STRIP COATED ADHESIVE PRODUCTS

[75] Inventor: Douglas M. Smith, Buffalo, N.Y.

[73] Assignee: Moore Business Forms, Inc., Grand Island, N.Y.

[21] Appl. No.: 416,287

[22] Filed: Apr. 4, 1995

[51] Int. Cl.[6] ................................ B32B 7/12; B41M 5/20

[52] U.S. Cl. .......................... 428/40.1; 283/81; 428/41.7; 428/41.8; 428/42.1; 428/195; 428/198; 428/354; 428/913; 503/204; 503/206; 503/226

[58] Field of Search ............................ 428/40, 354, 195, 428/198, 913, 40.1, 41.7, 41.8, 42.1; 503/204, 206, 226; 283/81

[56] References Cited

U.S. PATENT DOCUMENTS

| | | | |
|---|---|---|---|
| 3,312,005 | 4/1967 | McElroy | 40/2 |
| 4,037,816 | 7/1977 | Scott | 249/83 |
| 4,460,634 | 7/1984 | Hasegawa | 428/124 |
| 4,889,234 | 12/1989 | Sorensen et al. | 206/459 |
| 4,895,746 | 1/1990 | Mertens | 428/40 |
| 5,283,221 | 2/1994 | Inobe | 503/204 |
| 5,292,713 | 3/1994 | Stenzel | 428/40 |
| 5,324,078 | 6/1994 | Bane | 283/81 |
| 5,336,541 | 8/1994 | Kobayashi | 428/40 |
| 5,366,775 | 11/1994 | Kao | 428/40 |

FOREIGN PATENT DOCUMENTS 512153 11/1992 European Pat. Off. .

*Primary Examiner*—Nasser Ahmad
*Attorney, Agent, or Firm*—Nixon & Vanderhye P.C.

[57] ABSTRACT

A linerless label and method of production thereof are provided which result in a fully utilizable thermal transfer linerless label. A substrate of label material has first and second faces each having first and second substantially parallel first and second edges, and a coating of thermal transfer material substantially completely covers the first face. First and second adhesive release material patterns, such as strips of UV curable silicone, are disposed substantially along the first and second edges of the first face, and first and second adhesive patterns, such as strips of a permanent hot melt adhesive, are disposed substantially along the first and second edges of the second face in alignment with the silicone strips, the patterns covering less than fifty percent of the label faces. The width of the adhesive strips are less than the silicone strips. Ink registration marks may be imaged on the first face for registration of adhesive release material application, or for registration of perforation lines which may be provided perpendicular to the strips of adhesive and adhesive release material. The labels may be produced from a web more than one label wide, and slit along the adhesive and adhesive release material strips into label webs one label wide. The web may be taken up on a roll.

20 Claims, 1 Drawing Sheet

STRIP COATED ADHESIVE PRODUCTS

BACKGROUND AND SUMMARY OF THE INVENTION

Linerless labels are being increasingly popular because of the environmental advantages associated therewith, and for other operative advantages. However, there have been significant difficulties in producing fully functional linerless thermal transfer labels because a functional printable release material has not been successfully developed. According to the present invention it is possible to provide a linerless thermal transfer label by—instead of using a printable release material—leaving a conventional thermal transfer coating exposed and unaltered, and providing the adhesive and adhesive release material in a pattern to provide a fully functional label while at the same time not interfering with the thermal transfer function.

According to one aspect of the present invention a method of producing linerless thermal labels from a web of thermal transfer base stock having a first face with a thermal transfer coating thereon, and a second face, is provided. The method may be practiced in one pass on a Webtron 1600, or a like printing press, or other conventional equipment, and comprises the steps of: (a) Moving the web in a first direction; while the web is moving in the first direction. (b) Applying spaced patterns of adhesive release material to the first face substantially along the first direction and covering less than 50% of the first face. And (c) applying spaced patterns of adhesive to the second face substantially along the first direction, and substantially in alignment with the patterns of adhesive release material, and covering less than 50% of the second face. The method may also comprise the further step of forming perforations in the web substantially perpendicular to the first direction to define distinct labels in the first direction. The web may be at least two labels wide, in which case there is the further step of slitting the web along the first direction at the patterns of adhesive and adhesive release material, into label webs one label wide. The label web or webs are preferably taken up into rolls, although they may be cut or burst into individual labels, or strips containing a plurality of labels, each strip preferably one label wide.

There may also be the further step, before steps (b) and (c), of imaging registration marks on the first face with ink (as by utilizing conventional flexo technology). The ink—which preferably is dark—may be recognized by sensors or operators to facilitate proper alignment and application of the adhesive release material patterns and/or the perforations.

Steps (b) and (c) are typically practiced to apply the patterns as substantially continuous strips along edges extending in the first direction of individual labels, and so that the adhesive release material patterns are slightly wider than the adhesive patterns. Step (b) may be practiced by applying UV curable silicone release material on substantially continuous strips, and in that case there is the further step (substantially immediately after step (b)) of (d) of UV curing the silicone release material. Step (c) may be practiced after step (d) and by applying hot melt permanent adhesive.

According to another aspect of the present invention a linerless label is provided comprising the following components: A substrate of label material having first and second faces, each face having first and second substantially parallel first and second edges. A coating of thermal transfer material substantially completely covering the first face. First and second adhesive release material patterns disposed substantially along the first and second edges of the first face. The first and second adhesive release material patterns having first and second width dimensions in a direction perpendicular to the first and second edges. And first and second adhesive patterns disposed substantially along the first and second edges of the second face in alignment with the first and second adhesive release material patterns, respectively, the first and second adhesive patterns having third and fourth width dimensions, respectively, in a direction perpendicular to the first and second edges, the third and fourth widths not being significantly greater than the first and second widths, respectively.

The third and fourth dimensions are less than the first and second width dimensions, respectively, in the preferred embodiment, and the first and second width dimensions are typically substantially equal to each other, while the third and fourth width dimensions are also substantially equal to each other. The adhesive release material and adhesive patterns may both comprise substantially continuous strips; a preferred material for the adhesive release material is a UV curable silicone, while the preferred material for the adhesive is a hot melt permanent adhesive.

The linerless label may also further comprise ink registration marks imaged on the first face for registration of adhesive release material and/or perforation application. The linerless label may be in combination with a plurality of like labels, with perforation lines extending generally transverse to the first and second edges distinguishing the labels from each other.

It is the primary object of the present invention to provide an effective linerless thermal transfer label, and a method of manufacture thereof. This and other objects of the invention will become clear from an inspection of the detailed description of the invention, and from the appended claims.

DETAILED DESCRIPTION OF THE DRAWINGS

Figure 1:
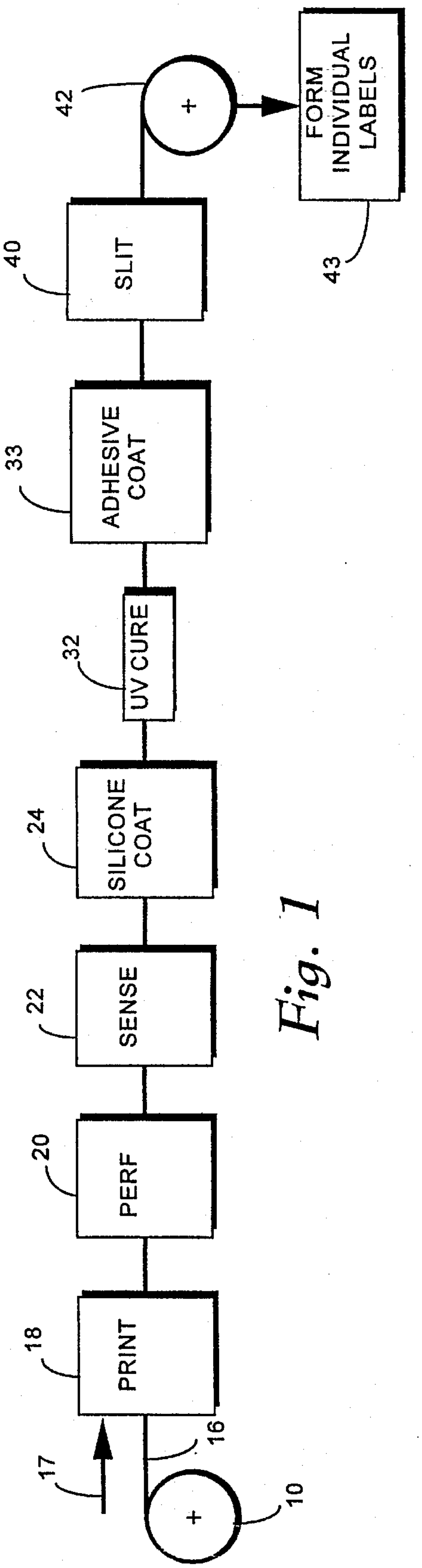
FIG. 1 is a schematic view illustrating various method steps that may be practiced for the production of linerless thermal labels according to the present invention.

FIG. 1 shows a roll of thermal transfer base stock 10 that is utilized to make linerless thermal transfer labels 11 (see FIGS. 2 and 3) according to the invention. The roll 10 preferably comprises commercially available thermal transfer base stock such as Consolidated #598. Such base stock comprises (see FIG. 2) a substrate 12 of label material (such as paper) having a first face 13 and a second face 14, with a thermal transfer coating 15 substantially completely covering the first face 13.

The web 16 is taken off from the roll 10 in a first direction 17. If registration marks are necessary or desirable for the practice of further steps according to the invention, web 16 is first imaged at a first station 18 with ink to apply registration marks on the first face 13 (over the thermal coating 15). Such registration marks are shown schematically at 19 in FIGS. 2 and 3. The stage 18 preferably comprises a flexographic printing stage, and the registration marks 19 that are printed are preferably in dark ink so that they may be readily sensed or viewed by an operator during subsequent processing.

As the web 16 continues in the direction 17, it also is preferably, although not necessarily, perfed as indicated by stage 20 in FIG. 1. The perforation lines—seen at 21 in FIG. 3—are formed substantially transverse to the first direction 17, and may be formed by using perforation blades and techniques such as shown in copending application Ser. No. 08/231,025 filed Oct. 6, 1994 (Attorney Docket 263-1238, 94-56). The strength or weakness of the perforations can be adjusted based upon customer requirements, and the distance between the perforation lines 21 in the direction 17 may also be varied.

As indicated by box 22 in FIG. 1, the registration marks 19 may be automatically sensed, for example, by an optical sensor although other types of sensors may be used (for example, magnetic sensors if the registration marks 19 are magnetic ink). While the utilization of the registration marks 19 and the automatic sensing 22 thereof is not necessary, they are desirable in order to properly position the equipment for subsequent application of adhesive release material and adhesive pattern, to assist in slitting or cutting of the labels from the webs, to assist in counting the number of labels passing past a certain point, to assist in applying the perforation lines 21, and/or to assist in other manners to reduce error and waste.

Figure 3:
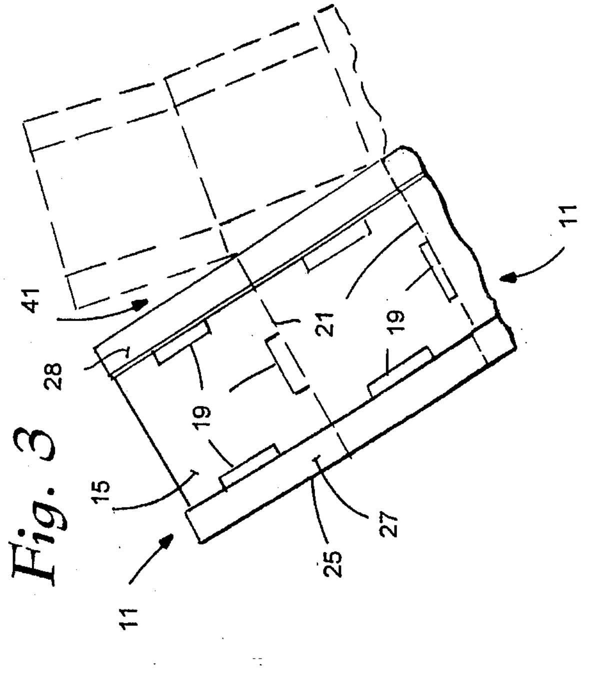
FIG. 3 is a top perspective view showing a web of linerless thermal transfer labels according to the invention.
Figure 2:
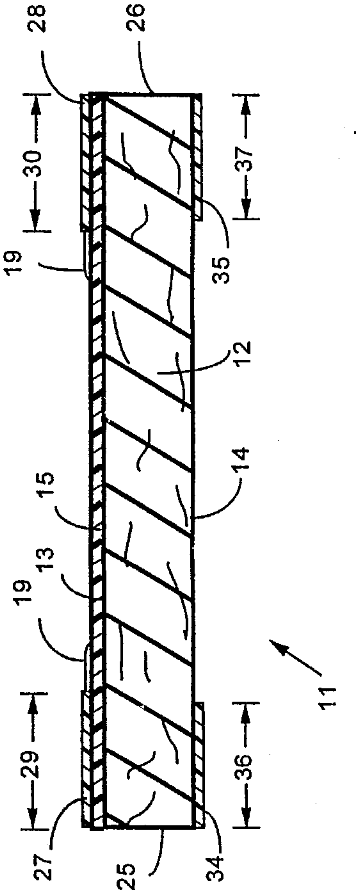
FIG. 2 is a cross sectional view, with the components greatly exaggerated in thickness for clarity of illustration, of an exemplary linerless thermal label according to the present invention.

The next stage illustrated in FIG. 1 is the silicone coat stage 24. An adhesive release material, such as a UV curable silicone release material such as General Electric #9300, is applied at stage 24 using flexographic techniques, or the like. The stage 24 applies patterns of silicone material along what are, or will become, the side edges of the label 11, and which cover much less than 50% of the first face 13. For example, for the label 11 illustrated in FIG. 2 having parallel first and second side edges 25, 26, the silicone patterns 27, 28 are applied along the edges 25, 26, substantially parallel thereto. While the patterns 27, 28 are shown just outside the registration marks 19, they may be applied over the registration marks where it is desired that the registration marks 19 are not visible further on. The patterns 27, 28 preferably are—as illustrated in FIG. 3—substantially continuous strips, although they may be provided in other forms, such as discontinuous strips, dots, a series of polygons, or a wide variety of other patterns. Each of the patterns 27, 28 has a particular width 29, 30 (respectively, as seen in FIG. 2). Preferably, the widths 29, 30 are approximately the same, and are only a small part of the total face 13 (and coating 15) width (e.g. covering 20% or less of the width of the face 13 under most circumstances and typically 20% or less of the entire first face 15 being covered thereby).

After application of the patterns 27, 28 the web 18 passes in the first direction 17 to an ultraviolet cure station 32 wherein the patterns 27, 28 are exposed to ultraviolet light which effects curing thereof. Then the web 16 passes in the direction 17 to an adhesive coat station 33. The adhesive may be applied at station 33 by a slot die extrusion mechanism, which is conventionally used for adhesive application, but instead of applying the adhesive over the entire face 14 it is applied in narrow patterns as indicated by the strips 34, 35 seen in FIG. 2. The patterns 34, 35 are—as for the patterns 27, 28—preferably substantially continuous strips, for example, of a hot melt adhesive, such as Swift #28082, although removable or repositional adhesive may also be utilized in some circumstances. Also, while continuous strips 34, 35 are desired, other patterns can be applied in the same manner as indicated for the silicone patterns 27, 28. In most circumstances, however, the patterns 27, 28 will be continuous strips, while the patterns 34, 35 may be continuous or discontinuous depending upon the particular type of adhesive used and how securely the final label 11 must be attached to a substrate in final use.

As for the strips 27, 28 the strips 34, 35 are disposed along the edges 27, 28 of the substrate 12, and they preferably have widths 36, 37 (see FIG. 2) which are not significantly greater than the widths 29, 30, and preferably are less than the widths 29, 30. For example, the widths 36, 37 may be 10–20% less than the respective, corresponding, widths 29, 30 of the silicone strips 27, 28 with which they are designed to cooperate so as to be sure that adhesive does not normally engage the thermal transfer coating 15 when the labels are in a roll configuration or stacked one on top of the other. In any event the adhesive covers less than 50% of the total area of face 14, and typically 20% or less.

While labels 11 can be made from a web 16 which is one label 11 wide, the web 16 may be two or more labels wide. In such a circumstance a slitting station 40 is desirable to slit the web 16 into individual webs one label 11 wide. FIG. 3 shows in solid line one web that is one label 11 wide, and shows in dotted line another web one label wide with the slit therebetween shown schematically by reference numeral 41. The individual webs may be taken up separately, or together, into a roll or rolls as indicated schematically at 42 in FIG. 1. The slitting occurs along the patterns 27, 28, 34, 35 to define one or both of the edges 25, 26, and in such circumstances the patterns 27, 28, 34, 35 in the middle of the web 16 will be twice as wide as desired, having the desired width 29, 30, 36, 37 after slitting at station 40.

If the webs are taken up on the roll 42 as illustrated schematically in FIG. 1, ultimately they are formed into individual labels, for example, first being formed into strips of labels which are stacked, and then separated, or separated at the use site by a dispenser or the like (either automatic or manual). As schematically illustrated by box 43 in FIG. 1, that is the labels 11 are ultimately separated—e.g. along the perforation lines 21—into the labels 11 either before or after passing through a thermal printing in which indicia is thermally impressed on the coating 15.

It will thus be seen that according to the present invention an advantageous method is provided for producing an advantageous linerless thermal transfer label. While the invention has been herein shown and described in what is conceived to be the most practical and preferred embodiments thereof, it will be apparent to those of ordinary skill in the art that many modifications may be made thereof within the scope of the invention. For example, additional silicone release material and adhesive strips may be applied transverse to the web 16 along what are the perforation lines 21 if additional holding power of the ultimate labels 11 when used as labels is required. In any event the invention is to be accorded the broadest interpretation of the appended claims so as to encompass all equivalent products and methods.

What is claimed is:

1. A linerless label, comprising:

a substrate of label material having first and second faces, each face having first and second substantially parallel side edges;

a coating of thermal transfer material substantially completely covering said first face;

first and second adhesive release material patterns disposed substantially along said first and second edges of said first face, said first and second adhesive release material patterns having first and second width dimensions in a direction perpendicular to said first and second edges, said first face having a substantially continuous exposed surface area of said thermal transfer coating between said first and second release patterns; and first add second adhesive patterns disposed substantially along said first and second edges of said second face in alignment with said first and second adhesive release material patterns, respectively, said first and second adhesive patterns having third and fourth width dimensions, respectively, in a direction perpendicular to said first and second edges, said third and fourth widths substantially equal to or less than said first and second widths, respectively.

2. A linerless label as recited in claim 1 wherein said third and fourth width dimensions are less than said first and second width dimensions, respectively.

3. A linerless label as recited in claim 2 wherein, said first and second width dimensions are substantially equal to each other, and said third and fourth width dimensions are substantially equal to each other.

4. A linerless label as recited in claim 3 wherein said adhesive release material and adhesive patterns both comprise substantially continuous strips.

5. A linerless label as recited in claim 4 wherein said adhesive release material is UV curable silicone.

6. A linerless label as recited in claim 5 wherein said adhesive comprises hot melt permanent adhesive.

7. A linerless label as recited in claim 2 further comprising ink registration marks imaged on said first face for registration of adhesive release material application.

8. A linerless label as recited in claim 2 in combination with a plurality of like labels, and further comprising perforation lines extending generally transverse to said first and second edges distinguishing the labels from each other.

9. A linerless label as recited in claim 2 wherein said adhesive release material and adhesive patterns both comprise substantially continuous strips.

10. A linerless label as recited in claim 2 wherein said adhesive release material is UV curable silicone.

11. A linerless label as recited in claim 2 wherein said adhesive comprises hot melt permanent adhesive.

12. A linerless label as recited in claim 2 wherein said third and fourth widths are 10–20% less than said first and second widths, respectively.

13. A linerless label as recited in claim 2 wherein said first and second release material patterns cover 20% or less of said first face.

14. A linerless label as recited in claim 1 wherein said first and second width dimensions are substantially equal, and said third and fourth width dimensions are substantially equal.

15. A linerless label as recited in claim 1 wherein said adhesive release material and adhesive patterns both comprise substantially continuous strips.

16. A linerless label as recited in claim 1 further comprising ink registration marks imaged on said first face for registration of adhesive release material application.

17. A linerless label as recited in claim 1 in combination with a plurality of like labels, and further comprising perforation lines extending generally transverse to said first and second edges distinguishing the labels from each other.

18. A linerless label as recited in claim 1 wherein said first and second release material patterns cover 20% or less of said first face.

19. A linerless label as recited in claim 4 wherein said first and second release material patterns cover 20% or less of said first face.

20. A linerless label as recited in claim 1 wherein said adhesive release material is UV curable silicone and wherein said adhesive comprises hot melt permanent adhesive.

* * * * *